3,009,854
NITROSOCARBAMATES AND METHOD OF CONTROLLING FUNGI, BACTERIA AND INSECTS
William F. Russell, Norwalk, Conn., assignor to R. T. Vanderbilt Company, Inc., New York, N.Y., a corporation of New York
No Drawing. Filed Nov. 3, 1959, Ser. No. 850,529
11 Claims. (Cl. 167—22)

This application is a continuation in part of my co-pending application Serial No. 556,104, filed December 29, 1955, and now abandoned, which is a continuation in part of my application Serial No. 433,791, filed June 1, 1954, now abandoned.

My invention relates to fungicidal, bactericidal, and insecticidal compounds and to a method for their application.

A number of pesticides which act primarily in the vapor phase, such as formaldehyde, methyl bromide, bromine, ethylene dichloride, paradichlorobenzene, nitrogen trichloride, diphenyl and chloropicrin, have been used for various preservative purposes, and are useful and of value in controlling molds, bacteria and insect pests. My present invention provides the art with a further means whereby fungi and bacteria, and in one embodiment also insects and their larvae, can be effectively controlled by means of a vapor phase treatment or process.

In accordance with my present invention, material normally subject to fungus and bacterial attack, e.g., fruits such as apples, peaches, oranges and bananas, and freshly harvested farm crops such as hay, grain, seed and corn, is preserved by introducing into an atmosphere surrounding the material an amount effective to prevent such attack of at least one nitrosocarbamate having the general formula

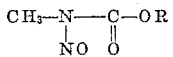

R is an alkyl radical having from 1 to 12 carbon atoms or monochloroalkyl radical having from 2 to 12 carbon atoms. Typical R radicals, therefore, include methyl, ethyl, propyl, butyl, etc.; and chloroethyl, chloropropyl, etc., Representative nitrosocarbamates include methyl N-nitroso-N-methylcarbamate, butyl N-nitroso-N-methylcarbamate, amyl N-nitroso-N-methylcarbamate, hexyl N-nitroso-N-methylcarbamate, n-octyl N-nitroso-N-methylcarbamate, 2-ethylhexyl N-nitroso-N-methylcarbamate, n-decyl N-nitroso-N-methylcarbamate, dodecyl N-nitroso-N-methyl-carbamate, 2-chloroethyl N-nitroso-N-methylcarbamate, and 3 chloro-n-propyl N-nitroso-N-methylcarbamate.

Of the compounds falling within the scope of the generic formula just stated, I have found that the compounds wherein R is n-butyl, n-amyl or n-hexyl, that is n-butyl, N-nitroso-N-methylcarbamate, n-amyl N-nitroso-N-methylcarbamate and n-hexyl N-nitroso-N-methylcarbamate, respectively, are outstanding from the standpoint of their effectiveness or high bactericidal and fungicidal activity. Thus, these compounds, which have not heretofore been prepared to the best of my knowledge, exhibit an activity approaching that of mercurial compounds, which are among the most highly active fungicides and bactericides known to the art.

The chemical compounds employed in accordance with my invention are not generally new. Some of them have previously been prepared and the remainder can be prepared utilizing procedures which are known in the art. Thus, methyl N-nitroso-N-methylcarbamate can be prepared as follows:

An aqueous solution containing two moles of methylamine is first prepared and into this solution is gradually run with good stirring one mole of methyl chlorocarbonate (methyl chloroformate). The solution now contains one mole of the compound $CH_3NHCOOCH_3$, the methyl ester of methylcarbamic acid, and one mole of methylamine hydrochloride. The next step is to convert the methyl ester of methylcarbamic acid to methyl N-nitroso-N-methylcarbamate. This is done by adding one mole of hydrochloric or one-half mole of sulfuric acid and then adding slowly one mole of aqueous sodium nitrite, the mixture being kept cool. The methyl N-nitroso-N-methylcarbamate separates from the solution as an oil and settles at the bottom of the reaction vessel, from which it can be run off directly. The product can be dried by allowing it to stand in contact with a drying material, such as anhydrous magnesium sulfate. The following reactions are involved:

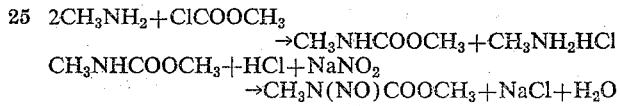

The normal butyl ester of N-nitroso-N-methyl carbamic acid can be prepared as follows: 124 grams of a 25% by weight aqueous solution of monomethylamine is admixed with 100 ml. of water and the mixture is then placed in an ice bath. With good stirring and cooling, 68.29 grams of n-butyl chlorocarbonate is added gradually. Thereafter, 45 ml. of 37% by weight hydrochloric acid (commercial concentrated hydrochloric acid) is added slowly, after which an aqueous solution of 35 grams of sodium nitrite dissolved in 75 ml. of water is added. The product separates as a pink oil, and is separated and dried with magnesium sulfate. Other alkyl nitroso carbamic acid esters can be prepared by reacting the proper monoalkyl amine and alkyl chlorocarbonate, and nitrosating the reaction product of the two.

These chemicals provide a new and effective means for sterilizing surfaces simply by placing the materials to be sterilized in an atmosphere in which a small amount of the chemical or mixture of chemicals is allowed to vaporize. The chemicals can be used in a number of ways in which pesticides have heretofore been used in the art, for example, as aerosols, in impregnated paper, in impregnated powders, in solution in various solvents, and so forth, to provide an environment in which the chemicals are present.

As mentioned above, one embodiment of my invention provides means whereby not only fungi and bacteria can be effectively controlled by vapor phase treatment but also insects and their larvae can be controlled by the vapor phase treatment. Thus, in practicing this embodiment of the present invention, nitrosocarbamates falling within the scope of the formula R'—N(NO)COOR wherein R is an alkyl radical having a number of carbon atoms, $n$, from 1 to 4, and R' is an alkyl radical having a number of carbon atoms, $n'$, from 1 to 2, or mixtures of such compounds in the vapor phase, are applied to articles, such as garments and fabrics, or to enclosed spaces, such as closets, to control insect pests. Of the compounds falling within the scope of the generic formula just stated, it has been found that those wherein the sum of $2n'+n$ is equal to at least 5 are outstanding from the standpoint of their effectiveness and high activity against insects and their larvae. For example, where R' is methyl and R is n-propyl or n-butyl, or where R' is ethyl and R is methyl or ethyl the compounds so described have superior properties.

The following examples illustrate the practice of my invention:

EXAMPLE I

In testing various compounds employed within the scope of my invention for fungicidal and bactericidal activity, the following test procedure was used. Measured quantities of an acetone solution of the compound were put on filter paper in the top of a Petri dish. The acetone was then allowed to evaporate, evaporation taking place in several minutes. Mycophil agar was poured into the bottom of the Petri dish and, after hardening, the agar was inoculated. The bottom of the Petri dish was then inverted so that the inoculated agar was directly above the filter paper containing the toxicant, the filter paper not touching the agar. The plates were then incubated in this position for 96 hours at 30° C.±2° C. and observed. Table I below sets forth results obtained using this test procedure. The test organisms used were *Bacillus subtilis*, *Staphylococcus aureus*, *Escherichia coli*, and *Aspergillus niger*.

Table II

| Gm. dust containing n-butyl N-nitroso-N-methylcarbamate | Percent seeds showing growth of | |
|---|---|---|
| | Bacteria | Fungi |
| 10 | 0 | 0 |
| 5 | 0 | 0 |
| 2.5 | 0 | 0 |
| 1 | 4.5 | 0 |
| 0.1 | 22 | 0 |
| Gm. dust containing n-amyl N-nitroso-N-methylcarbamate | | |
| 10 | 0 | 0 |
| 5 | 0 | 0 |
| 2.5 | 0 | 0 |
| 1 | 0 | 0 |
| 0.1 | 41 | 0 |
| Gm. dust containing n-hexyl N-nitroso-N-methylcarbamate | | |
| 10 | 0 | 0 |
| 5 | 11 | 0 |
| 2.5 | 18 | 0 |
| 1 | 12 | 0 |
| 0.1 | 32 | 0 |

Table I

| $CH_3N(NO)COOR$ | Bactericidal, p.p.m. needed to kill | | | Bacteriostatic, p.p.m. needed to prevent growth | | | Fungicidal, p.p.m. needed to kill A. niger | Fungistatic, p.p.m. needed to prevent growth A. niger |
|---|---|---|---|---|---|---|---|---|
| | B. subtilis | S. aureus | E. coli | B. subtilis | S. aureus | E. coli | | |
| R=methyl | +85 | 42 | +85 | +85 | 42 | +85 | *8.5 | 8.5 |
| R=ethyl | 42 | 8.5 | 42 | 42 | 8.5 | 0.8 | 8.5 | 4.2 |
| R=2-chloroethyl | +42 | +42 | 42 | 8.5 | 42 | 0.8 | 8.5 | 4.2 |
| R=n-propyl | +85 | 85 | 85 | 85 | 85 | 42 | 42 | 4.2 |
| R=n-butyl | 4.2 | 0.85 | 42 | 4.2 | 0.16 | 8.5 | *4.2 | 0.8 |
| R=isobutyl | +85 | 4.2 | 85 | +85 | 4.2 | 42 | 85 | 4.2 |
| R=n-amyl | 85 | 8.5 | 8.5 | 42 | 8.5 | 4.2 | *0.8 | 0.8 |
| R=n-hexyl | 42 | 42 | 4.2 | 8.5 | 8.5 | 0.16 | 8.5 | 4.2 |
| Ethyl N-nitroso-N-ethylcarbamate | 42 | 8.5 | 85 | 42 | 4.2 | 85 | 85 | 85 |

NOTE.—In the above table, the asterisk indicates bacterial contamination. The parts per million are parts per million of compound in the vapor phase, as determined by the amount of compound used and the volume of the Petri dish.

EXAMPLE II

In this test, 100 grams of wheat seed was placed in a jar and various amounts of compound added. When added, the compound was in the form of a dust, that is, the compound was in admixture with clay in a weight ratio of 6:94. The jar was then tumbled for fifteen minutes, after which the seeds were placed on Mycophil agar and observed for evidence of growth of microorganisms. Table II below sets forth the results obtained when this test was performed. An untreated control showed 100% bacterial and fungicidal contamination.

A standard agar incorporation test using *A. niger* has also been employed in order to determine the fungicidal activity of various compounds employed in accordance with my invention. In this test, the toxicant is incorporated into the agar and the agar is then inoculated with the test organism. The agar is then incubated at 30° C. for a period of 96 hours. The following amounts of compound were found to inhibit germination: methyl N-nitroso-N-methylcarbamate, 20 p.p.m.; ethyl N-nitroso-N-methylcarbamate, 20 p.p.m.; 2-chloroethyl N-nitroso-N-methylcarbamate, 20 p.p.m.; n-propyl N-nitroso-N-methylcarbamate, 10 p.p.m.; n-butyl N-nitroso-N-methylcarbamate, 5 p.p.m.; isobutyl N-nitroso-N-methylcarbamate, 20 p.p.m.; n-amyl N-nitroso-N-methylcarbamate, 5 p.p.m.; and n-hexyl N-nitroso-N-methylcarbamate, 10 p.p.m.

EXAMPLE III

Tests were conducted in 12-litre round-bottomed balloon flasks fitted with aluminum foil-covered cork stoppers. The toxicant to be tested, n-butyl N-nitroso-N-methylcarbamate was weighed into an aluminum foil cup and introduced into the flask. The atmosphere of the flask was stirred by means of an aluminum foil vane or propeller attached to a paper clip and driven by an external magnetic drive. Test insects, clothes moth larvae and carpet beetles were placed on standard test wool cloth dusted with brewer's yeast and the whole was placed in 150 x 20 millimeter glass culture tubes. Each tube was capped with a piece of fine mesh silk bolting cloth, held in place with a rubber band. The silk bolting cloth permitted a ready entry of the vapor and discouraged the escape of the test insects capable of climbing the glass walls. The culture tubes containing the test insects were hung in the central portion of the flask from the cork stopper by a suspending thread. With the culture tubes in place and the stopper firmly inserted, the flask was gently warmed on a steam bath just until the toxicant had been vaporized. The atmosphere in the flask was then agitated by propelling the stirring vane with the magnetic stirrer. In one of the balloon flasks the amount of toxicant was sufficient to produce a concentration of 8.3 parts per million based on the air volume. In another the concentration was 4.2 p.p.m. In a control flask, paradichlorobenzene was used, and in another control flask, no insecticide was added. After a period of 72 hours following initiation of the test, the percentage kill was determined. The results, which represent an average of a number of tests in each case, are presented in the following table.

| Insecticide | P.p.m. insecticide (based on air volume) | Percent killed at end of 72 hours | |
|---|---|---|---|
| | | Clothes moth larvae | Carpet beetles |
| $CH_3N(NO)COOC_4H_9$ | 8.3 | 100 | 100 |
| | 4.2 | 100 | 100 |
| p-dichlorobenzene | 8.3 | 60 | 100 |
| | 4.2 | 56 | 84 |
| None | | 6 | 6 |

EXAMPLE IV

The procedure described in Example III was carried out using as the insecticide n-propyl N-nitroso-N-methylcarbamate with the same controls as in Example III. The results of the test are presented in the following table:

| P.p.m. insecticide (based on air volume) | Percent killed at end of 72 hours | |
|---|---|---|
| | Clothes moth larvae | Carpet beetles |
| 8.3 | 100 | 100 |
| 4.2 | 100 | 100 |

EXAMPLE V

The procedure described in Example III was carried out using as the insecticide ethyl N-nitroso-N-ethylcarbamate with the same controls as in Example III. The results of the tests are presented in the following table.

| P.p.m. insecticide (based on air volume) | Percent killed at end of 72 hours | |
|---|---|---|
| | Clothes moth larvae | Carpet beetles |
| 8.3 | 100 | 100 |
| 4.2 | 100 | 100 |

EXAMPLE VI

The procedure described in Example III was carried out using as the insecticide methyl N-nitroso-N-ethylcarbamate with the same controls as in Example III. The results of the tests are presented in the following table:

| P.p.m. insecticide (based on air volume) | Percent killed at end of 72 hours | |
|---|---|---|
| | Clothes moth larvae | Carpet beetles |
| 8.3 | 100 | 100 |
| 4.2 | 100 | 100 |

EXAMPLE VII

Into tightly sealed test closets there were placed open glass receptacles containing confused flour beetles and clothes moth larvae, as well as inoculated plates of fungi and bacteria. There were also placed in the closets sheets of bleached cotton duck treated with n-butyl N-nitroso-N-methylcarbamate. The amount of the active insecticidal compound absorbed on the cotton cloth was determined gravimetrically, and on the basis of the volume of air in the closets the actual concentration in p.p.m. of insecticide in the air was determined. Temperature in the closets was 75° F. After a 72-hour test interval, the closet was opened and counts were made of the number of insects killed. The exposed Petri dishes containing the bacteria and fungi were removed, and sterile Petri dish covers were replaced. Evidence of growth was observed after 24 hours' incubation for bacteria and 5 days' incubation for fungi. The results are presented in the following table:

| P.p.m. of n-butyl N-nitroso-N-methylcarbamate | Clothes moth larvae, percent | Confused flour beetle, percent | Aspergillus niger | Penicillium sp. | Staphylococcus aureus | Escherichia coli | Salmonella typhosa |
|---|---|---|---|---|---|---|---|
| Control | 0 | 0 | + | + | + | + | + |
| 12.50 | 100 | 100 | 0 | 0 | 0 | 0 | 0 |
| 6.25 | 80 | 100 | 0 | 0 | 0 | 0 | 0 |

NOTE.—The + sign indicates the presence of living microorganisms and the "0" indicates sterility.

As has been stated above, the toxicants can be applied in the same manner in which toxicants have heretofore been used. For example aerosols can be prepared composed of about two parts by weight of liquid nitrosocarbamate toxicant and about 98 parts by weight of a suitable propellant, such as Freon 12 or methyl chloride.

Furthermore, impregnated powders can be prepared by suitably admixing from about 5 to about 50% by weight of a triosocarbamate toxicant with from about 95 to about 50 parts by weight of a suitable solid adsorbent carrier, such as pyrophillite, chalk, pyrethrum marc, diatomaceous earth, walnut shell flour, and so forth, as is well understood in the art. The particular amounts of toxicant and solid carrier chosen will depend upon various factors, such as the ability of the solid carrier to absorb the toxicant and upon the final strength desired for the final composition.

Although specific embodiments of the invention have been described herein, it is intended that the appended claims not be limited thereto but be afforded the scope which shall include all modifications and equivalents thereof.

I claim:

1. A method for the preservation of a material normally subject to fungus and bacterial attack which comprises introducing into an atmosphere surrounding said material at least one nitrosocarbamate selected from the class $$\mathrm{CH_3-\underset{\underset{NO}{|}}{N}-\underset{\underset{O}{\|}}{C}-OR}$$

in an amount effective to prevent such attack, R being a radical selected from the group consisting of alkyl radicals having from 1 to 12 carbon atoms and monochloroalkyl radicals having from 2 to 12 carbon atoms.

2. The method of claim 1 in which R is n-butyl.
3. The method of claim 1 in which R is n-amyl.
4. The method of claim 1 in which R is n-hexyl.
5. The method of claim 1 wherein said material is selected from the group consisting of fruits and farm crops.
6. The method of combatting insects which comprises vaporizing in an enclosed area to be protected against attack by insects at least one nitrosocarbamate of the formula $$\mathrm{R'-\underset{\underset{NO}{|}}{N}-\underset{\underset{O}{\|}}{C}-OR}$$

where R is an alkyl radical having a number of carbon atoms, $n$, from 1 to 4, and R' is an alkyl radical having a number of carbon atoms, $n'$, from 1 to 2, the amount of said nitrosocarbamate vaporized being sufficient to kill the insects.

7. The method as defined by claim 6 in which the sum of $2n'+n$ is at least 5.
8. The nitrosocarbamates of the formula $$\mathrm{CH_3N(NO)COOR}$$

in which R is a normal alkyl hydrocarbon radical having from 4 to 6 carbon atoms.

9. n-Butyl N-nitroso-N-methylcarbamate.
10. n-Amyl N-nitroso-N-methylcarbamate.
11. n-Hexyl N-nitroso-N-methylcarbamate.

References Cited in the file of this patent

UNITED STATES PATENTS 2,677,698　　Deutschman et al. _____ May 4, 1954

OTHER REFERENCES

Nirdlinger et al.: Am. Chem. J., vol. 43 (1910).
Gutmann: Chem. Abstracts, vol. 9 (1915), 1053(9).
Wrigley: Chem. Abstracts, vol. 42 (1948), 3488(i).
De Ong: Chemistry and Uses of Pesticides, 2nd ed., (1956), pp. 110–151, 201, 220.
Frear: Chemistry of the Pesticides, 3rd ed., 1955, pp. 118–134.
King: U.S. Dept. Agr. Handbook, No. 69, May 1954, pp. 106–108.

UNITED STATES PATENT OFFICE
CERTIFICATE OF CORRECTION

Patent No. 3,009,854

November 21, 1961

William F. Russell

It is hereby certified that error appears in the above numbered patent requiring correction and that the said Letters Patent should read as corrected below.

Column 6, line 71, for "triosocarbamate" read -- nitrosocarbamate --.

Signed and sealed this 10th day of April 1962.

(SEAL)
Attest:

ERNEST W. SWIDER
Attesting Officer

DAVID L. LADD
Commissioner of Patents